(12) United States Patent
Lee

(10) Patent No.: US 8,863,874 B2
(45) Date of Patent: Oct. 21, 2014

(54) MOUNTING STRUCTURE FOR IN-WHEEL MOTOR SYSTEM

(71) Applicant: Mando Corporation, Gyeonggi-do (KR)

(72) Inventor: Chung Seong Lee, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 0 days.

(21) Appl. No.: 13/735,697

(22) Filed: Jan. 7, 2013

(65) Prior Publication Data

US 2014/0020966 A1 Jan. 23, 2014

(30) Foreign Application Priority Data

Jan. 9, 2012 (KR) .................. 10-2012-0002312

(51) Int. Cl.
*B60K 1/00* (2006.01)
*B60K 7/00* (2006.01)

(52) U.S. Cl.
CPC ............. *B60K 7/0007* (2013.01); *B60K 7/00* (2013.01)
USPC ....................................... 180/65.51

(58) Field of Classification Search
USPC ....................................... 180/65.51
See application file for complete search history.

(56) References Cited

U.S. PATENT DOCUMENTS

| | | | |
|---|---|---|---|
| 5,087,229 A * | 2/1992 | Hewko et al. ............ | 475/149 |
| 5,150,763 A * | 9/1992 | Yamashita et al. ....... | 180/252 |
| 5,156,579 A * | 10/1992 | Wakuta et al. ........... | 475/161 |
| 5,163,528 A * | 11/1992 | Kawamoto et al. ...... | 180/65.51 |
| 5,180,180 A * | 1/1993 | Yamashita et al. ....... | 180/253 |
| 5,322,141 A * | 6/1994 | Brunner et al. .......... | 180/65.51 |
| 7,118,119 B2 * | 10/2006 | Amanuma ................ | 280/124.135 |
| 7,420,301 B2 * | 9/2008 | Veny et al. ............... | 310/75 C |
| 7,537,071 B2 * | 5/2009 | Kamiya .................... | 180/65.51 |
| 7,556,580 B2 * | 7/2009 | Saito et al. ............... | 475/154 |
| 7,641,010 B2 * | 1/2010 | Mizutani et al. ......... | 180/65.51 |
| 7,717,203 B2 * | 5/2010 | Yoshino et al. .......... | 180/65.51 |
| 7,735,589 B2 * | 6/2010 | Sugiyama ................ | 180/65.51 |
| 7,789,178 B2 * | 9/2010 | Mizutani et al. ......... | 180/65.51 |
| 7,932,652 B2 * | 4/2011 | DeVeny et al. .......... | 310/75 C |
| 7,958,959 B2 * | 6/2011 | Yogo et al. .............. | 180/65.51 |
| 8,157,036 B2 * | 4/2012 | Yogo et al. .............. | 180/65.51 |

(Continued)

FOREIGN PATENT DOCUMENTS

| KR | 10-0875004 B1 | 12/2008 |
|---|---|---|
| WO | 2010/112021 A1 | 10/2010 |

*Primary Examiner* — Jeffrey J Restifo
(74) *Attorney, Agent, or Firm* — Ohlandt Greeley Ruggiero & Perle L.L.P.

(57) ABSTRACT

A mounting structure for an in-wheel motor system is provided. The mounting structure includes the in-wheel motor system installed in a wheel of the vehicle, and a torsion beam axle (TBA) assembly to fix the in-wheel motor system to a vehicle body, wherein a rear portion of a motor housing includes a step portion formed in a stepped manner to have a decreased diameter, and a ring-shaped fastening face vertically arranged from the step portion, and the TBA assembly includes a trailing arm provided with a through hole to surround the step portion of the motor housing, a mount integrated with the trailing arm to fix the trailing arm to a vehicle body, and a plurality of fastening bolts to fix the motor housing to the trailing arm, wherein, when the step portion is fitted and coupled into the through hole, the fastening face closely contacts the trailing arm.

9 Claims, 7 Drawing Sheets

(56) References Cited

U.S. PATENT DOCUMENTS

| | | | |
|---|---|---|---|
| 8,220,808 B2* | 7/2012 | Kim | 280/124.107 |
| 8,245,803 B2* | 8/2012 | Murata et al. | 180/65.51 |
| 8,251,167 B2* | 8/2012 | Moriguchi et al. | 180/65.51 |
| 8,419,581 B2* | 4/2013 | Lo | 475/153 |
| 8,459,386 B2* | 6/2013 | Pickholz | 180/65.51 |
| 8,596,394 B2* | 12/2013 | Yoshino et al. | 180/65.51 |
| 8,596,395 B2* | 12/2013 | Hirano | 180/65.51 |
| 8,602,145 B2* | 12/2013 | Su et al. | 180/65.51 |
| 2007/0068715 A1* | 3/2007 | Mizutani et al. | 180/65.5 |
| 2007/0199748 A1* | 8/2007 | Ross et al. | 180/65.5 |
| 2008/0264705 A1* | 10/2008 | DeVeny et al. | 180/65.5 |
| 2008/0289891 A1* | 11/2008 | Yogo et al. | 180/65.5 |
| 2009/0166112 A1* | 7/2009 | Yoshino et al. | 180/65.51 |
| 2009/0312134 A1* | 12/2009 | Schoon | 475/154 |
| 2010/0163323 A1* | 7/2010 | Pickholz | 180/65.51 |
| 2011/0115343 A1* | 5/2011 | Walser et al. | 310/67 R |
| 2013/0048394 A1* | 2/2013 | Su et al. | 180/60 |

* cited by examiner

MOUNTING STRUCTURE FOR IN-WHEEL MOTOR SYSTEM

CROSS-REFERENCE TO RELATED APPLICATION(S)

This application claims the benefit of Korean Patent Application No. 2012-0002312, filed on Jan. 9, 2012 in the Korean Intellectual Property Office, the disclosure of which is incorporated herein by reference.

BACKGROUND

1. Field

Embodiments of the present invention relate to a mounting structure for an in-wheel motor system which allows the in-wheel motor system to be stably installed in a wheel of a vehicle and may increase efficiency of mounting and detaching of the in-wheel motor system.

2. Description of the Related Art

In general, an in-wheel motor, which is a technology applied to an electric motor using electricity as its power source, allows power to be directly transmitted from the motor disposed inside a rim of a wheel to the wheel, unlike transmission of power to the wheel through an engine, a transmission and a drive shaft to rotate the wheel in a gasoline-powered or diesel-powered vehicle.

Such an in-wheel motor may eliminate the need for driving and power transmitting devices such as an engine, transmission and differential gears, and thereby reduce the weight of the vehicle, provide independent control of the wheel, improve drive performance, and lower energy loss in power transmission.

FIG. 1 is a perspective view schematically illustrating installation of a conventional in-wheel motor system in a wheel, and FIG. 2 is a cross-sectional view illustrating the assembly of the in-wheel motor system of FIG. 1.

With reference to FIG. 1, when the in-wheel motor system is mounted to the wheel 10, it is moved from the inside of the vehicle toward the outside of the vehicle. The in-wheel motor system includes an axle 20 installed at the center of the wheel 10 to rotate along with the wheel 10, a reducer 30 to reduce the rotational force of the in-wheel motor 40 and transmit the reduced force to the axle 20, an in-wheel motor 40 connected to the reducer 30, and a disc brake 60 to generate braking force by applying pressure to a disc 50 arranged between the wheel 10 and the axle 20.

In such an in-wheel motor system, the reducer 30 needs to be provided to increase torque of the in-wheel motor 40, and a brake system performing braking, i.e., the disc 50 and the disc brake 60 need to be installed in the wheel 10, and thereby fastening the in-wheel motor system to the wheel 10 may result in inefficient use of space and poor drivability of the vehicle due to increase in unsprung mass.

Further, when the in-wheel motor system is mounted to the wheel 10, the disc 50, disc brake 60 and reducer 30 are positioned in the wheel, but due to limitation of the space in the wheel 30, the in-wheel motor 40 may protrude to the outside of the wheel 10, that is, toward the inside of the vehicle, and thus be damaged by shock from an external object.

Further, mounting the in-wheel motor system to the vehicle through a bracket (not shown), which usually has two bolt fastening holes, may prevent stable installation of the in-wheel motor system at the vehicle through a motor housing 41 of the in-wheel motor 40, resulting in uncertain effectiveness of support of the fastened in-wheel motor system when vibration and shock are transferred to the system from the road surface.

Korean Patent No. 10-0875004 discloses a structure of mounting an in-wheel motor system to a vehicle. According to the disclosure of the document, the in-wheel motor mounting structure is provided with a bolt fastening hole at a bracket of a stator of the in-wheel motor to allow a bolt to penetrate the hole, and the knuckle (bracket) to be installed at the vehicle is provided with two through holes which are penetrated by bolts, such that the bolts are fastened to the bolt fastening holes in the bracket of the stator through the through holes in the knuckle. That is, as described above, the effectiveness of the strength to support fastening of the in-wheel motor to the vehicle may be uncertain as vibration and shock are transferred from the road surface, and there may be a danger of damage to the system by external shock.

CITED REFERENCE

Patent Document

Korean Patent No. 10-0875004 (ILJIN GLOBAL CO., LTD.), Dec. 12, 2008, p. 4, Paragraphs 12 to 15, FIGS. 3 and 4.

SUMMARY

Therefore, it is an aspect of the present invention to provide a mounting structure for an in-wheel motor system which may provide a miniaturized compact in-wheel motor system to make the most use of the space in a wheel to prevent damage to an in-wheel motor and to ensure stable connection of the in-wheel motor system by improving the strength to support fastening of the in-wheel motor to a vehicle.

It is another aspect of the present invention to provide a mounting structure for an in-wheel motor system which may improve efficiency of installation and detachment of the in-wheel motor system by allowing the in-wheel motor to be easily installed at and detached from a vehicle, without interference with other components.

Additional aspects of the invention will be set forth in part in the description which follows and, in part, will be obvious from the description, or may be learned from practice of the invention.

In accordance with one aspect of the present invention, a mounting structure for an in-wheel motor system for installation of the in-wheel motor system in a vehicle includes the in-wheel motor system installed in a wheel of the vehicle to generate rotational force to drive the wheel, and a torsion beam axle (TBA) assembly to fix the in-wheel motor system to a vehicle body, wherein a rear portion of a motor housing forming an outer appearance of the in-wheel motor system includes a step portion formed in a stepped manner to have a decreased diameter, and a ring-shaped fastening face vertically arranged from the step portion, and the TBA assembly includes a trailing arm provided with a through hole penetrated to surround the step portion of the motor housing, a mount integrated with the trailing arm to fix the trailing arm to a vehicle body, and a plurality of fastening bolts to fix the motor housing to the trailing arm, wherein, when the step portion is fitted and coupled into the through hole, the fastening face closely contacts the trailing arm.

A plurality of fastening holes may be formed at a constant interval along an outer circumferential surface of the fastening face of the motor housing, and a plurality of coupling holes may be formed at positions corresponding to the fastening holes in a radial direction of the through hole of the trailing arm, such that the fastening bolts are screw-coupled to the fastening holes through the coupling holes.

The in-wheel motor system may include an in-wheel motor provided with a rotor and stator disposed in a space formed in the wheel to generate rotational force to drive the wheel, the rotor and stator being disposed to face each other to define an accommodating space therebetween, a cycloid reducer installed in the accommodating space of the in-wheel motor and provided with an output shaft to transmit a reduced rotational to an axle installed at the wheel, and an input shaft to penetrate the in-wheel motor to rotate along with the rotor, a disc installed at an end of the input shaft protruding through the in-wheel motor, a disc brake to apply breaking force to the disc, and the motor housing provided with a front housing surrounding a front portion of the in-wheel motor and having an open center and a rear housing surrounding a rear portion of the in-wheel motor and coupled with the front housing.

The cycloid reducer may include the input shaft fixed through the rotor to rotate along with the rotor, a pair of eccentric bearings connected to the input shaft to eccentrically transmit rotation of the input shaft, a pair of cycloid discs installed respectively at the eccentric bearings with each of the eccentric bearings positioned at a center of a corresponding one of the cycloid discs, and provided with a plurality of through holes radially formed around the center of each of the cycloid discs to eccentrically rotate the cycloid discs, a ring gear housing installed to surround the cycloid discs and provided with a plurality of rollers installed at a constant interval along an inner circumferential surface of the ring gear housing to contact outer circumferential surfaces of the cycloid discs to allow the cycloid discs to perform orbital rotation and rotation about the center of the cycloid discs, and the output shaft coupled with the axle to rotate along with the axle, and provided with a plurality of output pins inserted into the respective through holes to compensate eccentricity of the center of the cycloid discs.

An output housing and input housing having hollow portions to allow the output shaft and input shaft to respectively pass therethrough may be further provided respectively at a front of the output shaft and a rear of the ring gear housing, wherein the output housing, input housing and ring gear housing are coupled by a plurality of coupling bolts, and the coupling bolts are fastened to the motor housing to prevent rotation of the ring gear housing.

The output shaft may be provided with a shaft having a predetermined length and coupled with the axle, and a flange extending from an end of the shaft in a radial direction of the shaft, wherein the output pins may be installed at a rear of the flange.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
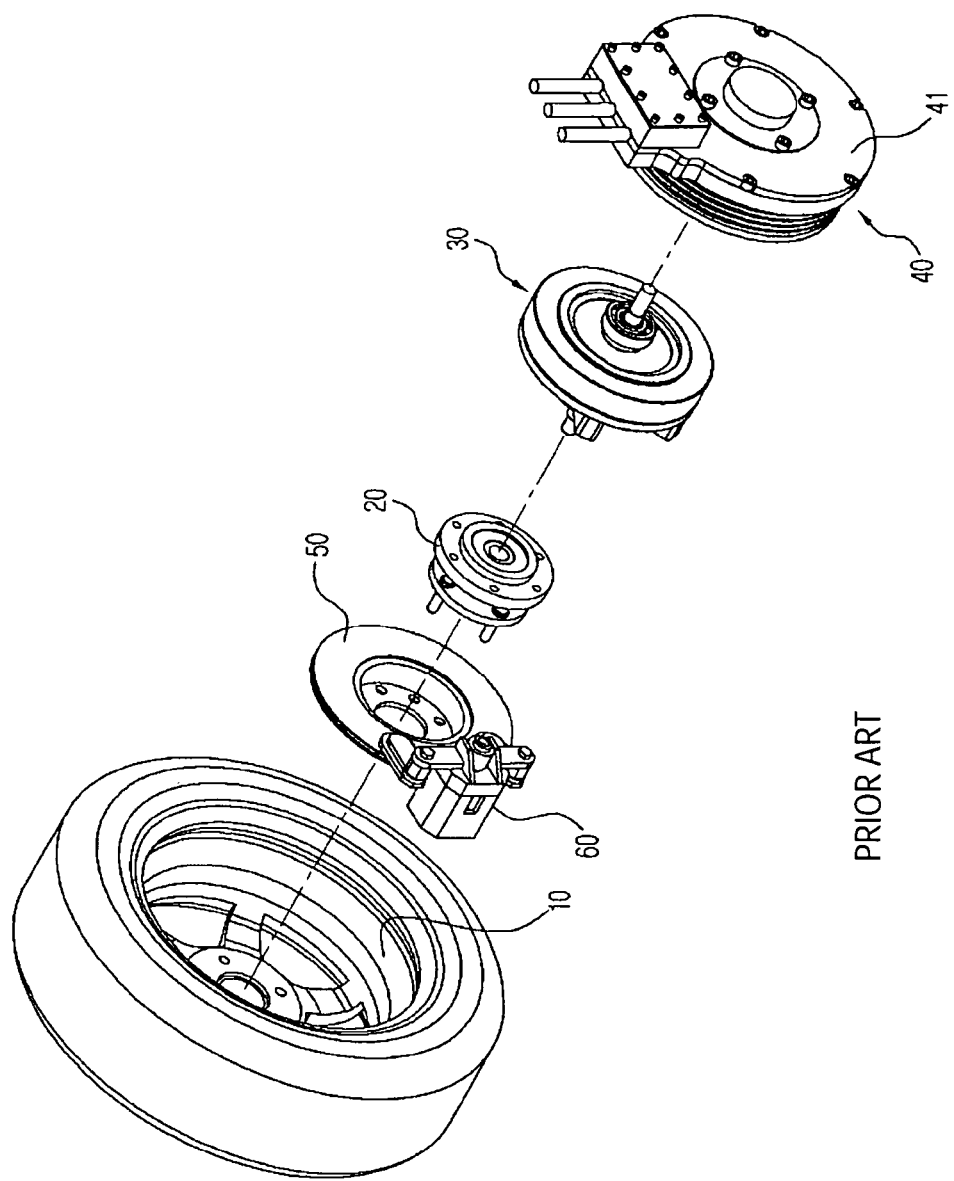
FIG. 1 is an exploded perspective view schematically illustrating a conventional in-wheel motor system.
Figure 2:
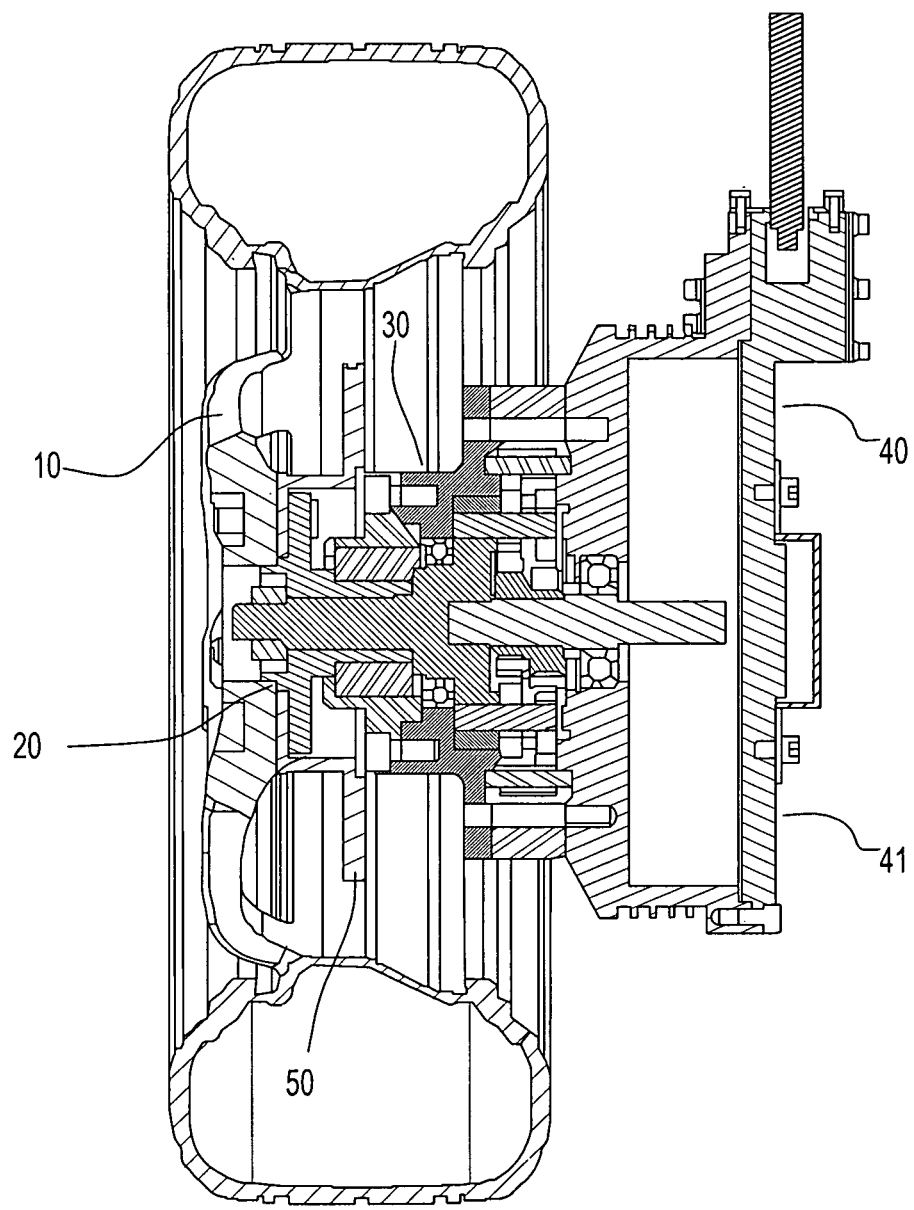
FIG. 2 is a cross-sectional view illustrating the assembly of the in-wheel motor system of FIG. 1.

Reference will now be made in detail to the embodiments of the present invention, examples of which are illustrated in the accompanying drawings. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The preferred embodiments described in the specification and shown in the drawings are only illustrative and are not intended to represent all aspects of the invention, such that various equivalents and modifications may be made without departing from the spirit of the invention.

Embodiments of the present invention are directed to a mounting structure for an in-wheel motor system which allows the in-wheel motor system to be stably mounted to a vehicle through a torsion beam axle (TBA) assembly (hereinafter, referred to as a TBA assembly). The structure of the in-wheel motor system is described below.

Figure 3:
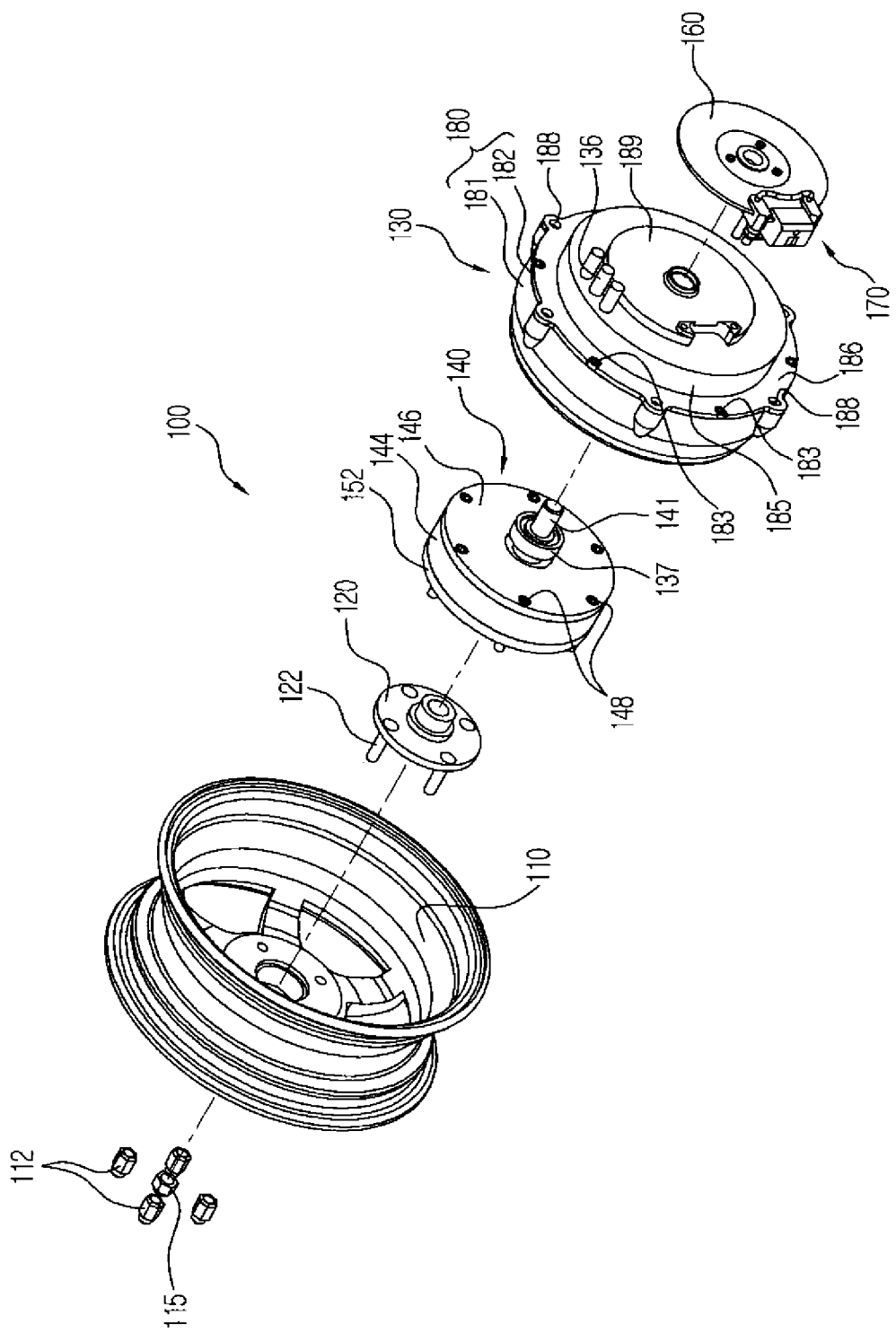
FIG. 3 is an exploded perspective view illustrating an in-wheel motor system of a mounting structure for an in-wheel motor system according to an exemplary embodiment of the present invention.
Figure 4:
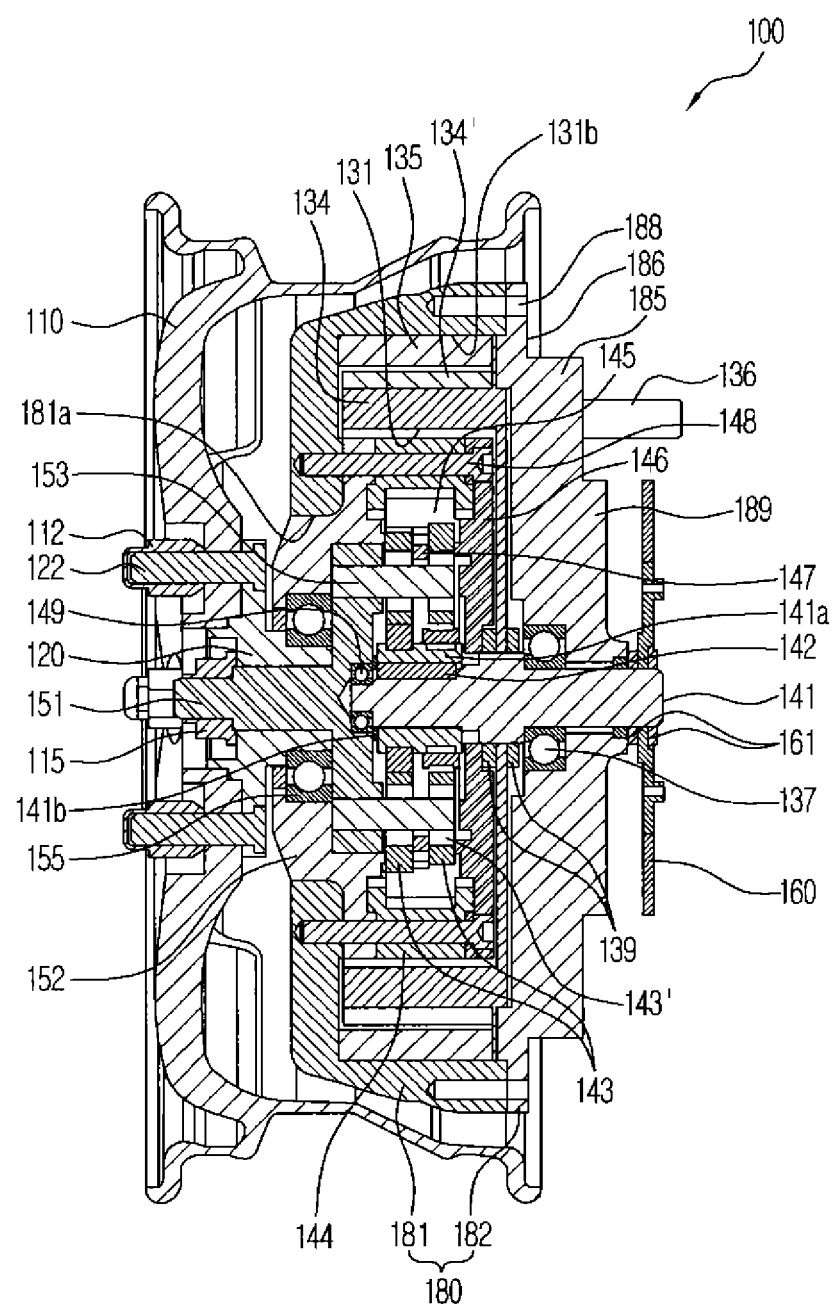
FIG. 4 is a cross-sectional view illustrating the assembly of FIG. 3.
Figure 5:
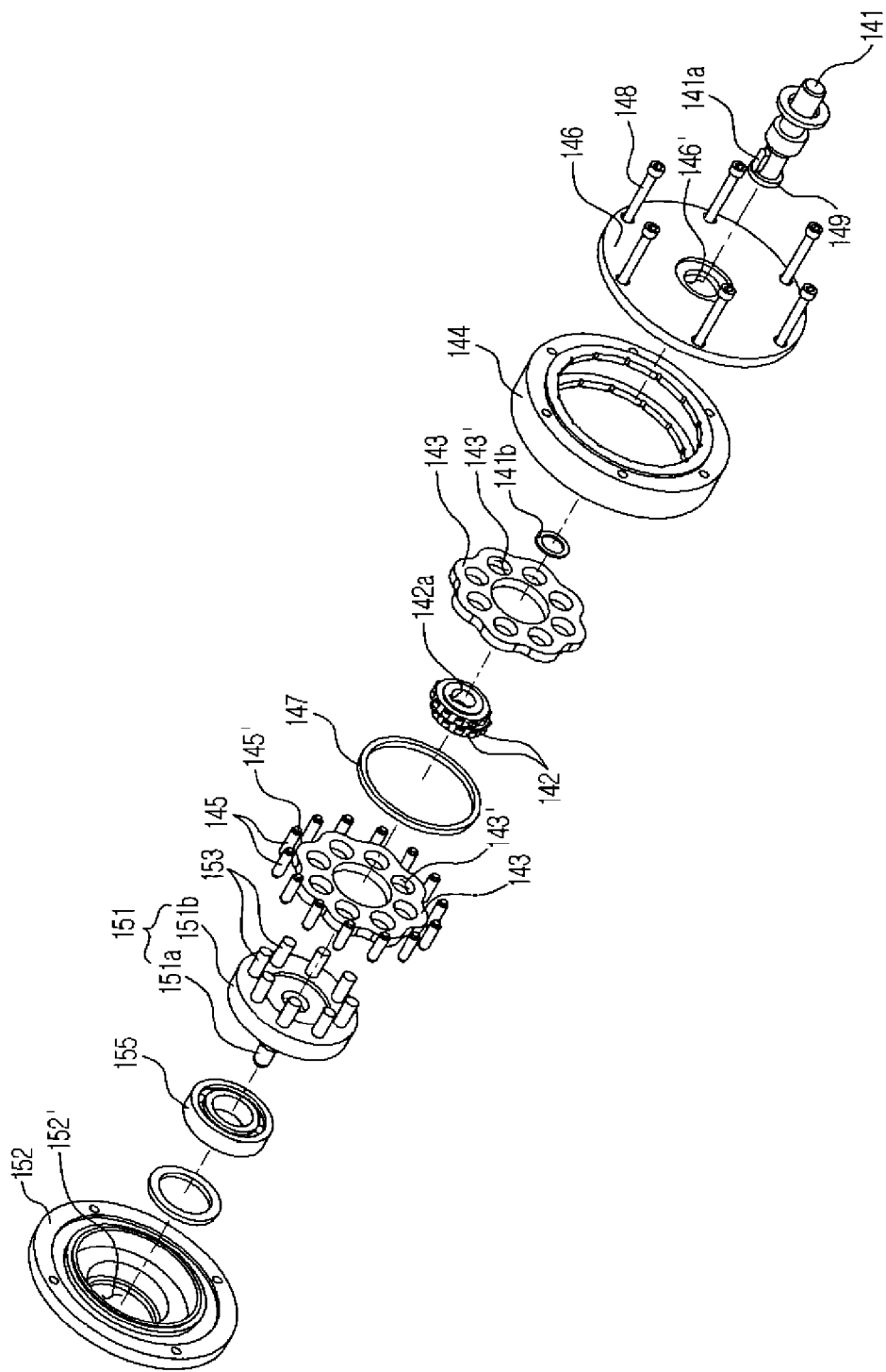
FIG. 5 is an exploded perspective view illustrating a cycloid reducer provided in the in-wheel motor system according to the exemplary embodiment of the present invention.

FIG. 3 is an exploded perspective view illustrating an in-wheel motor system according to an exemplary embodiment of the present invention, FIG. 4 is a cross-sectional view illustrating the assembly of FIG. 3, and FIG. 5 is an exploded perspective view illustrating a cycloid reducer provided in the in-wheel motor system.

With reference to FIGS. 3 to 5, the in-wheel motor system 100 according to the illustrated embodiment includes an axle 120 to rotate along with the wheel 110, an in-wheel motor 130 to generate rotational force to drive the wheel 110, a cycloid reducer 140 to reduce the rotational force and transmit the reduced force to the axle 120, a disc 160 rotated by the in-wheel motor 130, a disc brake 170 to apply pressure to the disc 160 to generate braking force, and a motor housing 180 to form an outer appearance of the in-wheel motor system 100.

The axle 120 is coupled with the wheel 110 to rotate along with the wheel 110. A plurality of axle bolts 122 is radially installed at the axle 120, apart from the center of the axle 120. The axle bolts 122 penetrate the wheel 110 and are fastened to the wheel 110 by the wheel nuts 112.

The in-wheel motor 130, which is an electric motor provided with a rotor 134 and a stator 135, is installed in the wheel 110 to generate power to drive the wheel 110. The in-wheel motor 130 is installed in the motor housing 180 having a front housing 181 and rear housing 182, which are assembled together by bolts 183, and an accommodating space 131 is provided in the middle of the motor housing 180. The in-wheel motor 130 is provided with the rotor 134 and stator 135 which are disposed in an inner space defined by assembly of the front housing 181 and rear housing 182 to face each other. Magnets 134' are installed along the outer circumferential surface of the rotor 134 to be spaced a predetermined distance apart from each other, and the stator 135, which is adapted to surround the rotor 134 at a distance apart from the rotor 134, is wound by a coil (not shown). When electric power is supplied to the coil, attractive force and repulsive force are generated between the magnets 134' and the coil to rotate the rotor 134.

The front housing 181 is provided with an open portion 181a having an opening at the center thereof. When the cycloid reducer 140, which will be described later, is installed in the accommodating space 131, the open portion 181a exposes a part of the cycloid reducer 140.

The rear portion of the rear housing 182 is provided with a step portion 185 formed in a stepped manner to have a decreased diameter, and a ring-shaped fastening face 186 vertically arranged from the step portion 185. A plurality of fastening holes 188 is formed spaced a distance apart from each other along the outer circumferential surface of the fastening face 186. The fastening holes 188 are installed to penetrate the rear housing 182 and a part of the front housing 181 and are provided with threads on the internal circumferential surface thereof. Each of the fastening holes 188 may be formed to have a length of about two-thirds of the width of the motor housing 180, thereby enhancing fastening of the motor housing 180 to the TBA assembly (see FIG. 6, '200') when the motor housing 180 is screw-coupled to the TBA assembly by fastening bolts (see FIG. 6, '240').

The fastening face 186, step portion 185 and fastening holes 188, which are provided to install the in-wheel motor system 100 at the TBA assembly 200, will be described below.

The rear wall of the rear housing 182, i.e., the step portion 185 is provide with a three-phase power terminal 136 to supply electric power to the coil and with an installation portion 189 at which the disc brake 170 is installed. The installation portion 189 protrudes from the rear wall of the step portion 185, and an input shaft 141 is installed at the installation portion 189 through the center of the installation portion 189. That is, as shown in FIGS. 3 to 5, the disc 10 is installed at the end of the input shaft 141, and the disc brake 170 is installed at the installation portion 189 so as to apply pressure to the disc 160. A bearing 137 is installed between the input shaft 141 and the installation portion 189, and the disc 160 installed at one end of the input shaft 141 is fixed by a pair of disc fixing nuts 161 installed at the front and rear of the disc 160 such that the disc 160 rotates together with the input shaft 141. Here, the three-phase power terminal 136 and installation portion 189 formed at the step portion 185 and the disc 160 are installed such that they do not protrude from the step portion 185 in the radial direction of the step portion 185. This prevents the components formed at the step portion 185 from interfering with insertion of the step portion 185 into a through hole (see FIG. 6, 215') of a trailing arm (see FIG. 6, '210') of the TBA assembly 200, which will be described later.

The disc 160 and disc brake 170 are brake devices commonly used to slow a vehicle to a stop and thus would be sufficiently understood by those skilled in the art, and therefore a detailed description thereof will be omitted.

The cycloid reducer 140 according to the illustrated embodiment includes the input shaft 141 coupled with the rotor 134, a pair of eccentric bearings 142 connected to the input shaft 141 to eccentrically transmit the rotation of the input shaft 141, a pair of cycloid discs 143 eccentrically rotated by the eccentric bearings 142, a ring gear housing 144 with rollers 145 installed thereon to allow the cycloid discs 143 to be fixed and rotate on their own axis, and an output shaft 151 provided with output pins 153 which are respectively inserted into a plurality of through holes 143' formed in the cycloid discs 143.

The cycloid reducer 140, which functions to amplify rotational torque of the in-wheel motor 130, is disposed in the accommodating space 131 of the in-wheel motor 130.

The input shaft 141 has a predetermined length and is installed through the rotor 134. As shown in FIGS. 3 to 5, the input shaft 141 has a portion near the center thereof fitted into the rotor 134, and is fixed to rotate together with the rotor 134 by the input shaft fixing nuts 139 installed to closely contact the front and rear of the rotor. One end portion of the input shaft 141 penetrates the rear housing 182 of the motor housing 180, and the disc 160 is installed at the one end of the input shaft 141, as described above. The other end portion of the input shaft 141 is coupled with the pair of eccentric bearings 142. The other end of the input shaft 141 is provided with a key 141a protruding from the outer circumferential surface of the input shaft 141, and each of the eccentric bearings 142 is provided with a keyway 142' which matches the key 141a in shape.

A joint ring 141b is installed at the other end of the input shaft 141 to prevent displacement of the eccentric bearings 142.

The pair of eccentric bearings 142 is provided with an eccentric hole formed to be displaced from the center of the eccentric bearings 142 to allow the input shaft 141 to be inserted into the holes and eccentrically rotate. The eccentric bearings 142 are connected to the input shaft 141 with the centers thereof spaced apart from each other.

The cycloid discs 143 are installed respectively at the eccentric bearings 142 with each of the eccentric bearings 142 positioned at the center of the corresponding cycloid disc 143. That is, a pair of cycloid discs 143 is provided and eccentrically rotated by the eccentric bearings 142.

Such cycloid discs 143 are provided with a plurality of through holes 143' radially arranged around the centers of the cycloid discs 143. As shown in FIGS. 3 to 5, each of the cycloid discs 143 is provided with eight through holes 143' spaced a distance apart from each other. The number of the though holes 143' may be increased or decreased depending on the capacity of the cycloid discs 143, and an output pin 153 is inserted into each of the through holes 143' to compensate the eccentricity of the centers of the cycloid discs 143.

Provided at the outer circumferential surface of each of the cycloid discs 143 is a lobe having a continuous cycloid curve. A louver ring 147 is interposed between the cycloid discs 143 to space the cycloid discs 143 apart from each other.

The ring gear housing 144 is arranged to surround the cycloid discs 143 at a certain distance apart from the cycloid discs 143. Installed at the inner circumferential surface of the ring gear housing 144 is a plurality of rollers 145 to cause rotation of the cycloid discs 143 by contacting the outer circumferential surfaces of the cycloid discs 143, i.e., the lobes. The rollers 145 are installed at ring pins 145' rotatably installed along the inner circumferential surface of the ring gear housing 144 at a constant interval, and contact the outer circumferential surfaces of the cycloid discs 143. The ring gear housing 144 is fixed to the motor housing 180 by coupling bolts 148, which will be described later, and thus rotation of the ring gear housing 144 is prevented.

The output shaft 151 serves to receive the reduced rotational force from the cycloid discs 143 and transmit the rotational force to the axle 120. The output shaft 151 has a predetermined length, and is provided with a shaft 151a coupled with the axle 120, and a flange 151b extending from the end of the shaft 151a in a radial direction. Installed at the rear of the flange 151b is a plurality of output pins 153 which are inserted into respective through holes 143'. It is obvious that the number of the output pins 153 is equal to that of the through holes 143'.

In addition, arranged respectively at the front of the output shaft 151 and the rear of the ring gear housing 144 are an output housing 152 and input housing 146 which are provided with hollow portions 152' and 146' through which the output shaft 151 and input shaft 141 may pass. The output housing 152 and input housing 146 serve to protect the components of the cycloid reducer 140 described above. The output housing 152, input housing 143 and ring gear housing 144 are coupled by the coupling bolts 148. As the coupling bolts 148 are fastened to the front housing 181 of the motor housing 180, rotation of the ring gear housing 144 is prevented.

Reference numeral 149 indicates a ball bearing installed between the input shaft 141 and the output shaft 151 to prevent rotational force of the input shaft 141 from being directly transmitted from the output shaft 151, reference numeral 155 indicates a hub bearing installed between the output housing 152 and the axle 120, reference numeral 115 indicates a flange nut coupled to the end of the output shaft 151.

In the cycloid reducer 140 as above, the cycloid discs 143 contact the rollers 145 in the ring gear housing 144 to perform rotation about the center thereof and orbital rotation when the eccentric bearings 142 connected to the input shaft 141 rotating along with the rotor 134 of the in-wheel motor 130 rotates. For example, if the cycloid discs 143 are rotated clockwise by the eccentric bearings 142, the cycloid discs 143 rotate clockwise about the center thereof, while performing orbital rotation counterclockwise in engagement with the rollers 145. That is, the rotational momentum of the cycloid discs 143 corresponds to the number of reduced output rotations, and thus, using this mechanism, the reduced rotational force is transmitted to the axle 120 through the output shaft 151. As rocking of the cycloid discs 143 is cancelled by connecting the output pins 153 to the through holes 143' of the cycloid discs 143, the axle 120 and the shaft 151a are aligned with each other when they rotate via the rotational force received through the output shaft 151.

That is, when the in-wheel motor 130, cycloid reducer 140 and axle 120 are connected in series to amplify the drive force of the in-wheel motor 130 through the cycloid reducer 140 and transmit the amplified drive force to the axle 120, the cycloid motor 140 is installed in the in-wheel motor 130, and the in-wheel motor 130 is positioned within the wheel 110. Thereby, overall size of the in-wheel motor system may be reduced compared to conventional cases. Therefore, damage to the in-wheel motor 130 by external shock may be prevented, and as the unsprung mass is reduced, traveling safety of the vehicle may be improved, installation of the in-wheel motor system may be facilitated, and freedom in design may be further improved through enhanced usability of an installation space.

In order to stably fasten the in-wheel motor system 100 to the vehicle, the TBA assembly 200 is used in mounting operation.

Figure 6:
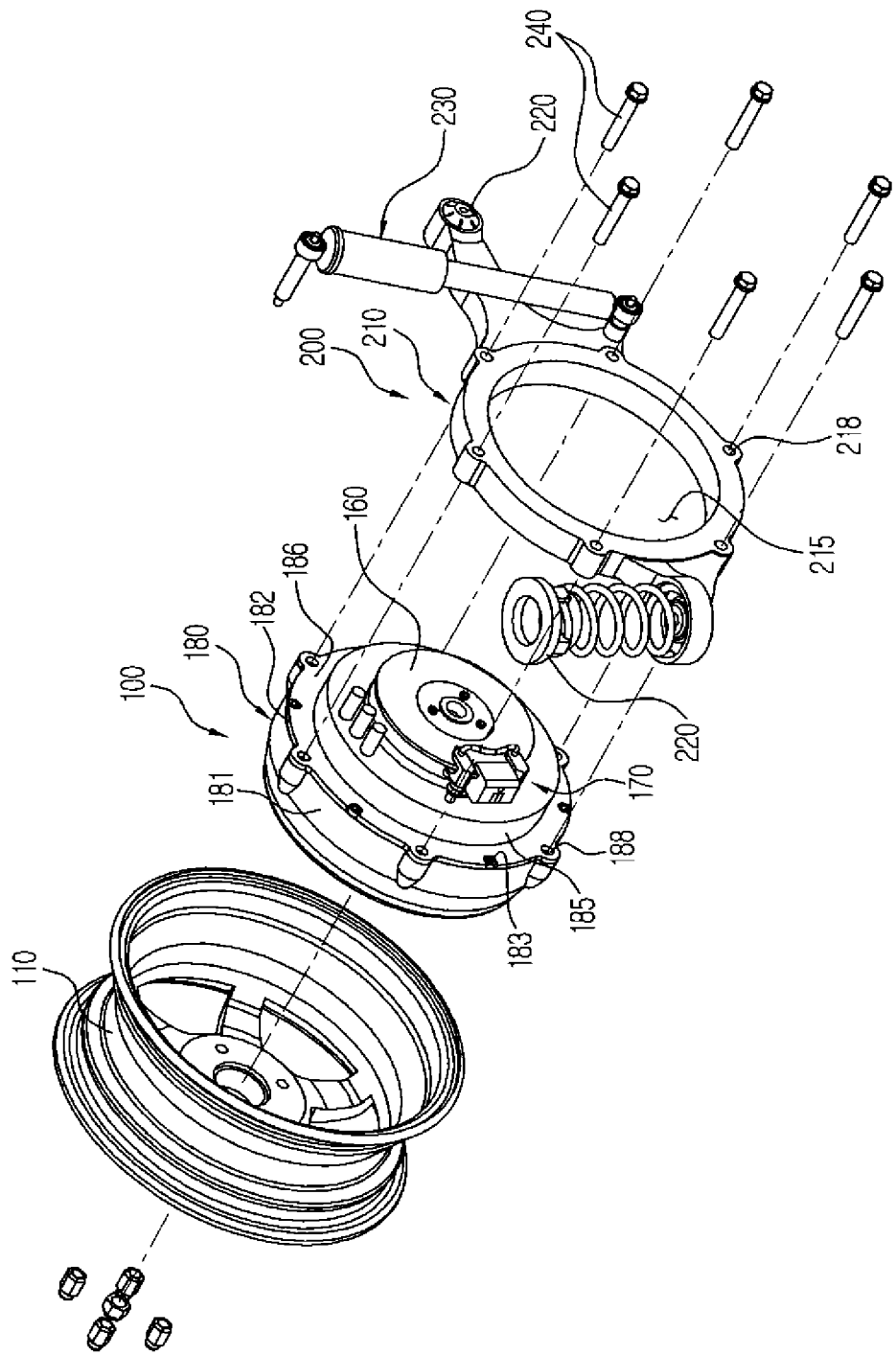
FIG. 6 is an exploded perspective view illustrating a mounting structure for the in-wheel motor system according to the exemplary embodiment of the present invention.
Figure 7:
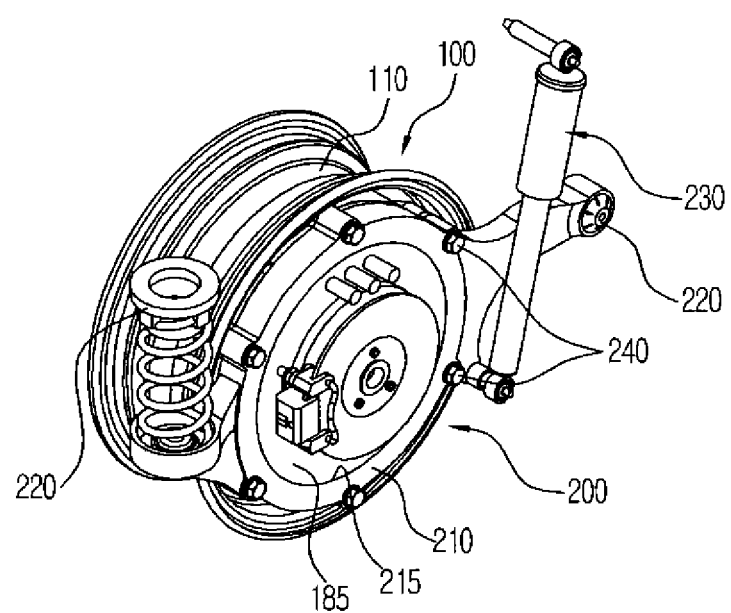
FIG. 7 is a cross-sectional view illustrating the assembly of FIG. 6.

FIG. 6 is an exploded perspective view illustrating the mounting structure for the in-wheel motor system according to the exemplary embodiment of the present invention, and FIG. 7 is a cross-sectional view illustrating the assembly of FIG. 6.

With reference to FIGS. 6 and 7, a mounting structure for the in-wheel motor system according to the illustrated embodiment of the present invention includes the in-wheel motor system 100 mounted in the wheel 100 of a vehicle, and the TBA assembly 200 fixed to the vehicle with the in-wheel motor 100 installed thereto.

The TBA assembly 200, which is intended to fix the in-wheel motor system 100 to the vehicle, includes a trailing arm 210 coupled with the motor housing 180 forming the outer appearance of the in-wheel motor system 100, a mount 220 to fix the trailing arm 210 to a vehicle body. Reference numeral 230 indicates a shock absorber, an apparatus used to stabilize the vehicle body by damping elastic action of a spring. Since the shock absorber is a well known technology, a detailed description thereof will be omitted.

The trailing arm 210 is provided with a through hole 215 penetrated to surround the step portion 185 of the motor housing 180. The diameter of the through hole 215 may correspond to that of the step portion 185. Also, a plurality of fastening holes 218 are formed at the trailing arm 210 in a radial direction of the through hole 215, and arranged at positions corresponding to those of the through holes 188 formed in the motor housing 180. Accordingly, once the step portion 185 is slid and inserted into the through hole 215 to combine the motor housing 180 with the trailing arm 210, the step portion 185 is supported by the through hole 215 and the fastening face 186 of the motor housing 180 closely contacts the trailing arm 210. Here, it is obvious that the fastening holes 188 formed at the motor housing 180 are aligned with the coupling holes 218.

When the motor housing 180 is combined with the trailing arm 210 as above, the motor housing 180 is fixed to the trailing arm 210 through the fastening bolts 240. That is, by screw-coupling the fastening bolts 240 to the fastening holes 188 through the coupling holes 218, the motor housing 180 is fixed.

In addition, FIGS. 6 and 7 illustrate that six fastening holes 188 and six coupling holes 218 are provided and combined by the fastening bolts 240, but embodiments of the present invention are not limited thereto. The numbers of the fastening holes 188 and couplings holes 218 may be selectively decreased or increased to stably fix the motor housing 180.

The mount 220 is integrally formed at the trailing arm 210 and coupled to the vehicle body through separate bolts (not shown).

Since the in-wheel motor system 100 is allowed to be assembled or disassembled through the fastening bolts 240 fastened to or removed from the TBA assembly 200 which is fixed to the vehicle body, the in-wheel motor system 100 may be easily assembled and disassembled without interference with other components. Also, as a plurality of fastening bolts 240 is coupled to the motor housing 180 along with the trailing arm 210 to allow the trailing arm 210 to surround the motor housing 180, the fastened area may increase and the combination may be stably maintained.

As is apparent from the above description, a mounting structure for an in-wheel motor system according to embodiments of the present invention may increase the fastening contact area in mounting a motor housing of the in-wheel motor system to a vehicle, thereby securing the effectiveness of support of coupling between the in-wheel motor and the vehicle against vibration and shock.

Second, the in-wheel motor system may be easily installed at and detached from the vehicle, without interference with other components.

Third, design freedom may be improved by ensuring a space for a cycloid reducer and the in-wheel motor.

Fourth, by mounting the in-wheel motor to a wheel such that the in-wheel motor is positioned in the wheel, the in-wheel motor may be protected from shock by an external object and damage to the in-wheel motor may be prevented.

Finally, as a miniaturized compact in-wheel motor system is provided, unsprung mass may be reduced, and thereby traveling safety may be increased.

Therefore, compared to conventional cases in which a washer is used or a stopper is mounted at the upper side of opposite ends of the bypass passage, the overall length of the shock absorber may be reduced and thus waste of raw materials may be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mounting structure for an in-wheel motor system for installation of the in-wheel motor system in a vehicle, comprising:
   the in-wheel motor system installed in a wheel of the vehicle to generate rotational force to drive the wheel; and
   a torsion beam axle (TBA) assembly to fix the in-wheel motor system to a vehicle body,
   wherein:
   a rear portion of a motor housing forming an outer appearance of the in-wheel motor system includes a step portion formed in a stepped manner to have a decreased diameter, and a ring-shaped fastening face vertically arranged from the step portion; and
   the TBA assembly includes:
   a trailing arm provided with a through hole penetrated to surround the step portion of the motor housing;
   a mount integrated with the trailing arm to fix the trailing arm to a vehicle body; and
   a plurality of fastening bolts to fix the motor housing to the trailing arm,
   wherein, when the step portion is fitted and coupled into the through hole, the fastening face closely contacts the trailing arm, and
   wherein the rear portion faces away from the wheel and includes an installation portion at which a disc brake is installed.

2. The mounting structure according to claim 1, wherein a plurality of fastening holes is formed at a constant interval along an outer circumferential surface of the fastening face of the motor housing, and a plurality of coupling holes is formed at positions corresponding to the fastening holes in a radial direction of the through hole of the trailing arm, such that the fastening bolts are screw-coupled to the fastening holes through the coupling holes.

3. The mounting structure according to claim 1, wherein the in-wheel motor system includes:
   an in-wheel motor provided with a rotor and stator disposed in a space formed in the wheel to generate rotational force to drive the wheel, the rotor and stator being disposed to face each other to define an accommodating space therebetween;
   a cycloid reducer installed in the accommodating space of the in-wheel motor and provided with an output shaft to transmit a reduced rotational to an axle installed at the wheel, and an input shaft to penetrate the in-wheel motor to rotate along with the rotor;
   a disc installed at an end of the input shaft protruding through the in-wheel motor;
   a disc brake to apply breaking force to the disc; and
   the motor housing provided with a front housing surrounding a front portion of the in-wheel motor and having an open center and a rear housing surrounding a rear portion of the in-wheel motor and coupled with the front housing.

4. The mounting structure according to claim 3, wherein the cycloid reducer includes:
   the input shaft fixed through the rotor to rotate along with the rotor;
   a pair of eccentric bearings connected to the input shaft to eccentrically transmit rotation of the input shaft;
   a pair of cycloid discs installed respectively at the eccentric bearings with each of the eccentric bearings positioned at a center of a corresponding one of the cycloid discs, and provided with a plurality of through holes radially formed around the center of each of the cycloid discs to eccentrically rotate the cycloid discs;
   a ring gear housing installed to surround the cycloid discs and provided with a plurality of rollers installed at a constant interval along an inner circumferential surface of the ring gear housing to contact outer circumferential surfaces of the cycloid discs to allow the cycloid discs to perform orbital rotation and rotation about the center of the cycloid discs; and
   the output shaft coupled with the axle to rotate along with the axle, and provided with a plurality of output pins inserted into the respective through holes to compensate eccentricity of the center of the cycloid discs.

5. The mounting structure according to claim 4, wherein an output housing and input housing having hollow portions to allow the output shaft and input shaft to respectively pass therethrough are further provided respectively at a front of the output shaft and a rear of the ring gear housing,
   wherein the output housing, input housing and ring gear housing are coupled by a plurality of coupling bolts, and the coupling bolts are fastened to the motor housing to prevent rotation of the ring gear housing.

6. The mounting structure according to claim 4, wherein the output shaft is provided with a shaft having a predetermined length and coupled with the axle, and a flange extending from an end of the shaft in a radial direction of the shaft, wherein the output pins are installed at a rear of the flange.

7. A mounting structure for an in-wheel motor system for installation of the in-wheel motor system in a vehicle, comprising:
   the in-wheel motor system installed in a wheel of the vehicle to generate rotational force to drive the wheel; and
   a torsion beam axle (TBA) assembly to fix the in-wheel motor system to a vehicle body,
   wherein:
   a rear portion of a motor housing forming an outer appearance of the in-wheel motor system includes a step portion formed in a stepped manner to have a decreased diameter, and a ring-shaped fastening face vertically arranged from the step portion; and
   the TBA assembly includes:
   a trailing arm provided with a through hole penetrated to surround the step portion of the motor housing;
   a mount integrated with the trailing arm to fix the trailing arm to a vehicle body; and
   a plurality of fastening bolts to fix the motor housing to the trailing arm,
   wherein, when the step portion is fitted and coupled into the through hole, the fastening face closely contacts the trailing arm,
   wherein the cycloid reducer includes:
   the input shaft fixed through the rotor to rotate along with the rotor;

a pair of eccentric bearings connected to the input shaft to eccentrically transmit rotation of the input shaft;

a pair of cycloid discs installed respectively at the eccentric bearings with each of the eccentric bearings positioned at a center of a corresponding one of the cycloid discs, and provided with a plurality of through holes radially formed around the center of each of the cycloid discs to eccentrically rotate the cycloid discs;

a ring gear housing installed to surround the cycloid discs and provided with a plurality of rollers installed at a constant interval along an inner circumferential surface of the ring gear housing to contact outer circumferential surfaces of the cycloid discs to allow the cycloid discs to perform orbital rotation and rotation about the center of the cycloid discs; and the output shaft coupled with the axle to rotate along with the axle, and provided with a plurality of output pins inserted into the respective through holes to compensate eccentricity of the center of the cycloid discs.

8. The mounting structure according to claim 7, wherein an output housing and input housing having hollow portions to allow the output shaft and input shaft to respectively pass therethrough are further provided respectively at a front of the output shaft and a rear of the ring gear housing, wherein the output housing, input housing and ring gear housing are coupled by a plurality of coupling bolts, and the coupling bolts are fastened to the motor housing to prevent rotation of the ring gear housing.

9. The mounting structure according to claim 7, wherein the output shaft is provided with a shaft having a predetermined length and coupled with the axle, and a flange extending from an end of the shaft in a radial direction of the shaft, wherein the output pins are installed at a rear of the flange.

* * * * *